United States Patent [19]

Johnson

[11] 3,721,169
[45] March 20, 1973

[54] RANGE RESPONSIVE FLASH UNIT
[75] Inventor: Bruce K. Johnson, Andover, Mass.
[73] Assignee: Polaroid Corporation, Cambridge, Mass.
[22] Filed: Dec. 24, 1970
[21] Appl. No.: 101,336

[52] U.S. Cl..................95/11 L, 95/45, 240/1.3, 240/46.03
[51] Int. Cl..........................G03b 3/02, G03b 15/03
[58] Field of Search..........95/11, 11 L, 45, 44, 11.5, 95/55, 56; 240/1.3, 46.01, 46.03, 46.05, 46.07, 46.09, 46.27, 46.45

[56] References Cited

UNITED STATES PATENTS

| | | |
|---|---|---|
| 3,296,947 | 1/1967 | Engelsmann et al............95/11.5 R X |
| 3,491,667 | 1/1970 | Land.................................240/1.3 X |
| 3,016,454 | 1/1962 | Simms..............................240/46.03 |
| 2,608,640 | 8/1952 | Willoughby...................240/46.05 XR |
| 3,538,825 | 11/1970 | Taylor..................................95/11 L |
| 3,456,101 | 7/1969 | Rentschler et al...................95/11 R |
| 1,145,414 | 7/1915 | Heiberger et al..................240/46.09 |
| 3,203,331 | 8/1965 | Hofmann............................95/64 R |
| 2,378,207 | 6/1945 | Fuller.....................................95/56 |

FOREIGN PATENTS OR APPLICATIONS

| | | |
|---|---|---|
| 570,422 | 2/1933 | Germany................................95/56 |
| 1,288,421 | 1/1969 | Germany................................95/55 |

*Primary Examiner*—Robert P. Greiner
*Attorney*—Brown & Mikulka, William D. Roberson and Michael Bard

[57] ABSTRACT

The subject disclosure describes a flash unit, the light output of which is automatically adjusted throughout a given range of illumination values by mechanical means in conformance with the distance settings of a camera with which it is incorporated to provide so-called "follow-focus" operation. A cooperating manually operable "trim" means enables an optional overall modification or shift in the degree of light output independent with the aforesaid distance settings. The flash unit may be of the electronic flash or "strobe" type or may comprise a flash cube or the like.

The subject flash unit includes a plurality of telescoping apertured plates which are sequentially advanced through a cam and linkage assembly connected to the camera focus adjusting means so as to selectively vary the net aperture through which illumination from the flash lamp may travel to a subject.

26 Claims, 9 Drawing Figures

INVENTOR.
BRUCE K. JOHNSON

BY Brown and Mikulka
and
Michael Bard
ATTORNEYS

PATENTED MAR 20 1973 3,721,169
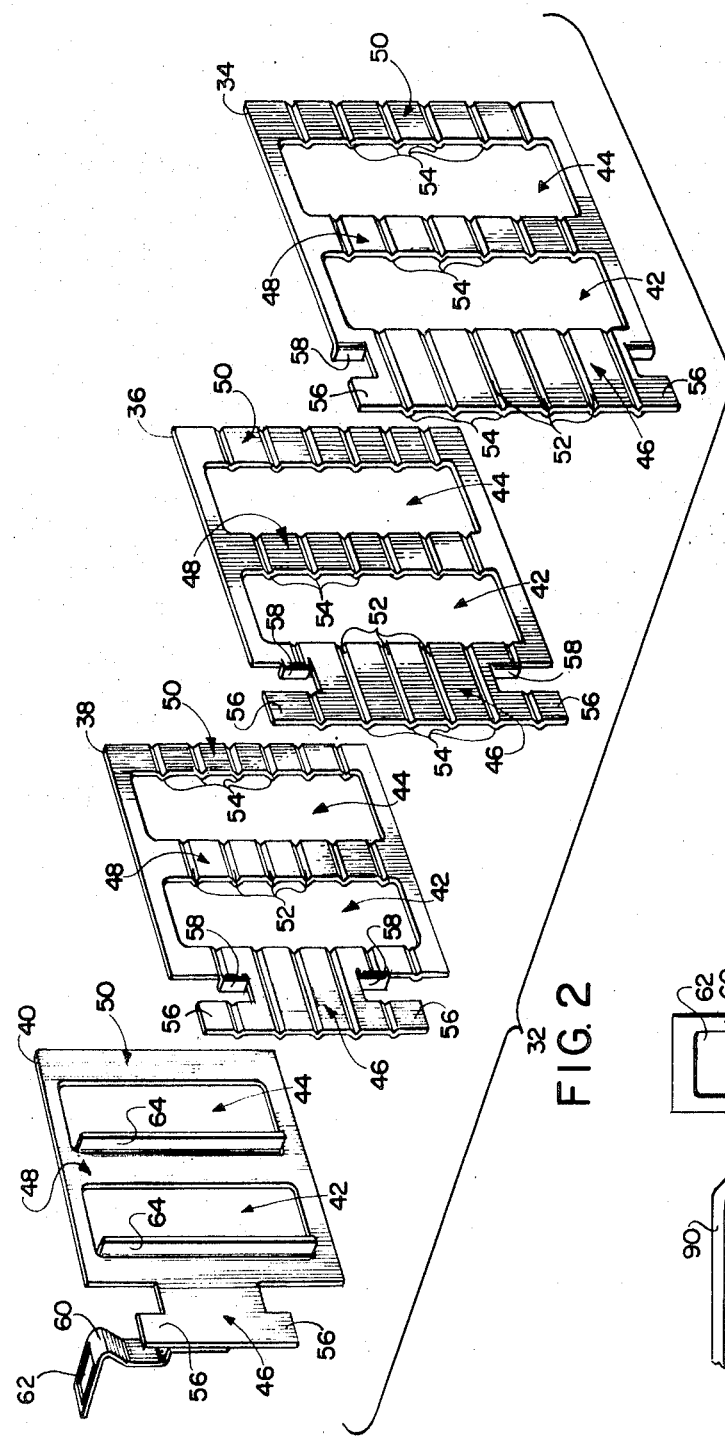
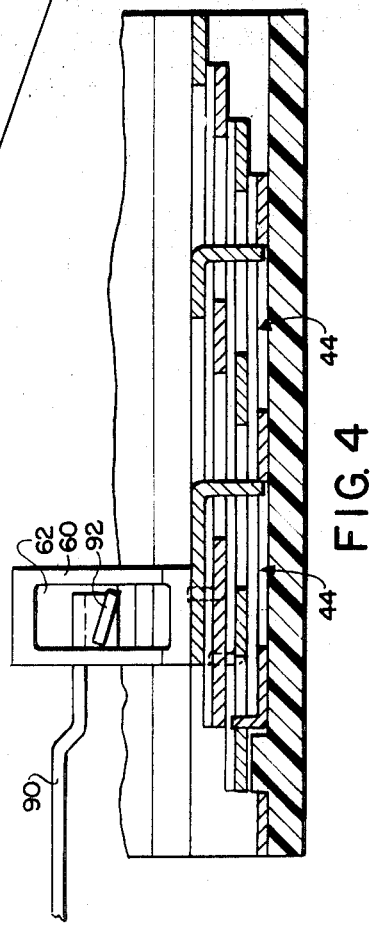
INVENTOR.
BRUCE K. JOHNSON
BY Brown and Mikulka
and
Michael Bard
ATTORNEYS

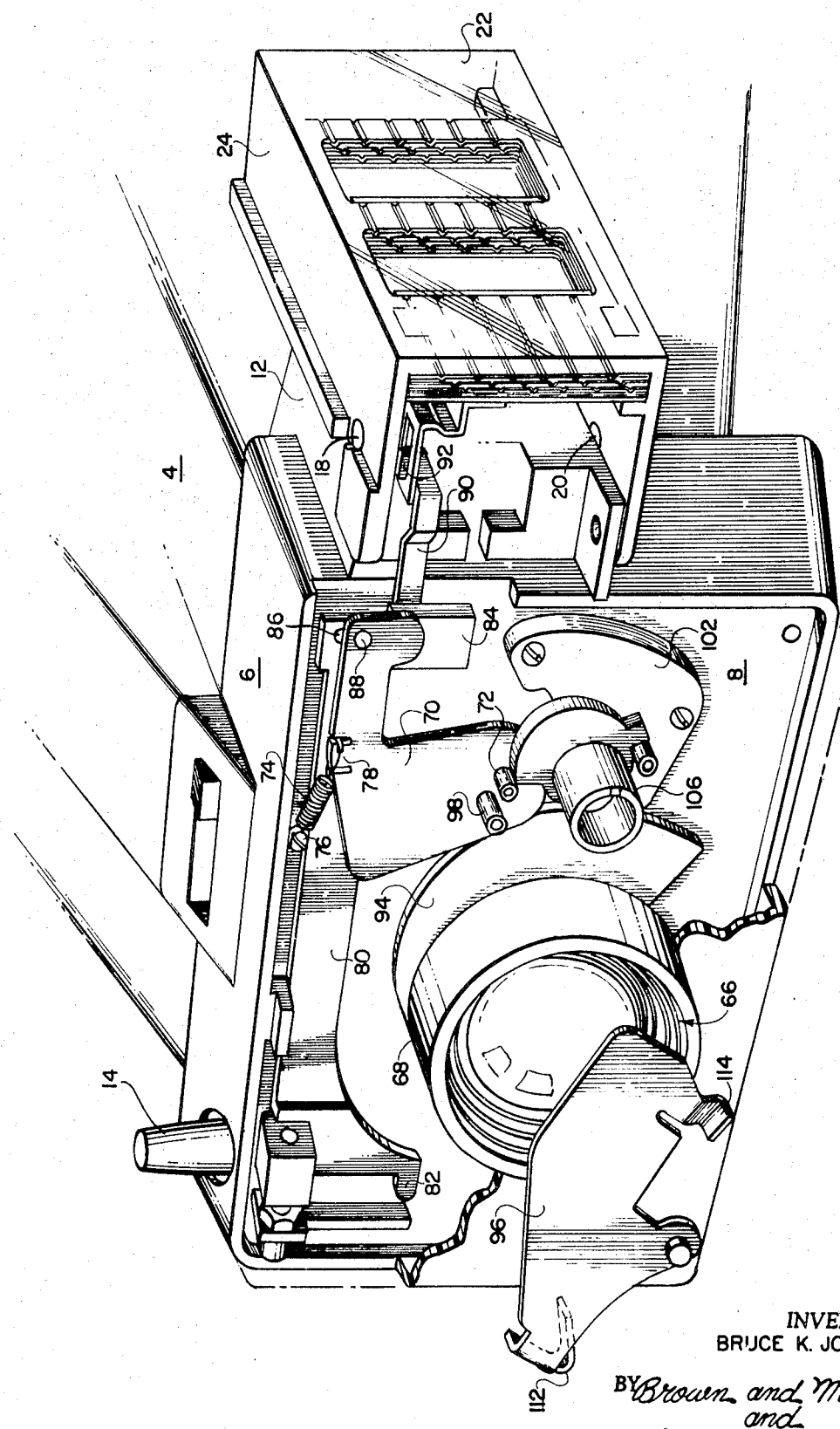

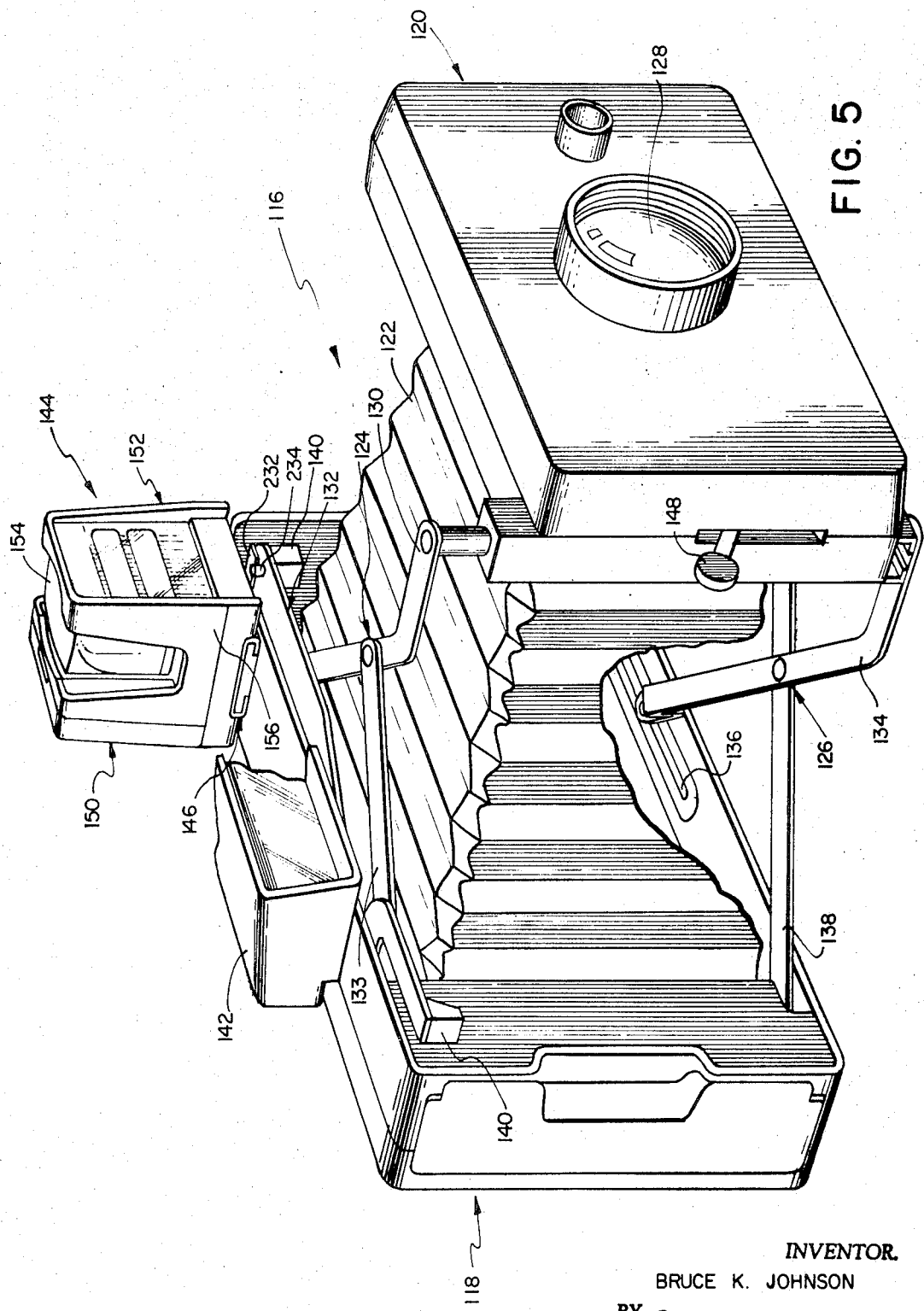

PATENTED MAR 20 1973 3,721,169

INVENTOR.
BRUCE K. JOHNSON

BY Brown and Mikulka
and
Michael Bard
ATTORNEYS

RANGE RESPONSIVE FLASH UNIT

BACKGROUND OF THE INVENTION

Certain prior art cameras incorporated automatic shutters comprising an exposure control circuit wherein a photoresponsive resistor unit is positioned for receiving light from a subject being photographed to produce exposures of a duration dependent upon the resistance of the photoresponsive resistor. Such resistor functions to integrate the light from the entire scene and provide satisfactory ambient light exposures over a wide range of conditions. The photoresponsive resistor is also capable of sensing light from a subject to control the duration of the flash exposure where such illumination is utilized.

It has been found, however, that less than satisfactory exposures frequently result when the subject is indoors, and is illuminated with a flash lamp, and that improved and more consistent results are obtainable by setting the shutter to produce an exposure of a predetermined interval long enough (e.g., one-thirtieth of a second) to take full advantage of the light output of a conventional flash lamp in controlling the light energy reaching the film by another means.

In one type of prior art device for controlling flash lamp illumination output, a plurality of adjustable louvers are disposed across the face of a flash lamp and serve to control the amount and direction of light emitted according to their rotational positions. The louvers are actuated by means of a cam and lever system operatively connected to the focus control of the camera whereby adjusting the focus control effects predetermined rotation of the louvers to vary the passage of light therebetween and provide an essentially correct illumination of a subject at any of a plurality of distance settings.

A cooperating trim mechanism functions to enable an overall shift in the rotational position of the louvers to alter the illumination at any given focus setting as may be desired. Thus, for example, a setting may be modified by the trim mechanism to voluntarily alter the exposure, e.g., to accommodate some known peculiarity of film sensitivity; to satisfy a preference for a darker or lighter print; to enable a slight increase of illumination range; or for some other reason. Such a prior art system is described in copending application Ser. No. 56,079 filed June 29, 1970 and commonly assigned herewith.

Prior art systems of the louver type described above, necessarily provide changing patterns of illumination of a subject depending on the range of said subject. Typically, the louvers form a pattern on the subject resulting from reflection of light from the flash lamp off the surface of the louvers, thereby substantially curtailing the illumination reaching the subject. In order to provide a more even distribution of illumination across the subject it was necessary to utilize a frosted lens or the like in front of the flash lamp.

In another prior art approach to the problem of modulating flash lamp light output, cover means comprising a generally scissor-like device was provided for engagement with the focusing means of a camera so as to vary the amount of light blocked as a function of the lens-to-subject distance for which the lens was focused. The scissor-like cover means comprised a pair of plates adapted to pivot toward or away from each other so as to vary the size of the opening therebetween as a function of subject-to-camera range. Typical of such a scissor-type flash lamp modulation device, is that disclosed in U. S. Pat. No. 3,491,667, issued to E. H. Land, on Jan. 27, 1970 and commonly assigned herewith.

Scissor-like devices such as described above have many inherent disadvantages which adversely affect the illumination of the subject. For example, such devices typically cause vignetting to the edges of the subject because they inherently and selectively block illumination to the edges of the subject. Also, such scissor-like devices do not effectively modulate the illumination passing generally centrally therethrough and, therefore, the light distribution across the subject will not remain uniform as the range of the subject changes.

In view of the foregoing, it is an object of the present invention to provide photoflash lamp modulation means for use with a focusable camera and incorporating means for selectively and uniformly illuminating a subject as a function of the focus setting of the camera.

Another object of the present invention is to provide means for selectively and uniformly varying the illumination reaching a photographic subject as a function of the range of said subject whilst eliminating vignetting within the field of illumination.

Yet another object of the instant invention is to provide a follow-focus photoflash lamp output modulator for use with a camera, of the type employing socket means for receiving and operably securing a flash cube or the like, wherein said modulator is adapted to fold away and cover said socket when not in use and is erectable to selectively block light emanating from a flash cube, inserted in said socket, from reaching a subject as a function of the range of said subject.

It is a further object of the present invention to provide a follow-focus photoflash lamp output modulator for use with a focusable camera and comprising a plurality of telescoping apertured plates adapted to be sequentially advanced as a function of the focus setting of said camera.

It is a still further object of the present invention to provide means for use with a camera employing photoflash lamp illumination means including a plurality of apertured plates or the like adapted to be sequentially advanced in response to changes in the focus setting of said camera so as to vary the aperture through which light from said photoflash lamp may reach a subject.

SUMMARY OF THE INVENTION

The subject invention provides a flash unit, the light output of which is automatically adjusted throughout a given range of illumination values in conformity with the range between a camera and a subject. A cooperating manually operable trim mechanism enables an optional overall modification or shift in the degree of light output independent of the range of the subject.

In one embodiment of the subject invention, the flash unit is integral with a photographic camera of the type illustrated in copending application, Ser. No. 41,681, filed May 25, 1970, by David E. Van Allen.

Such a photographic camera contemplates apparatus usable in flash photography for releasably mounting a multi-lamp photoflash unit or flash cube thereon. The apparatus is mounted on the camera for rotation relative thereto and is engageable with a flash cube unit for rotatably connecting the unit to the camera. Rotation of the apparatus sequentially positions each lamp of the flash cube in a predetermined location for ignition in timed relationship with the exposure producing operation of the photographic camera.

In the embodiment of the subject invention envisioned for use with such a photographic camera, cover means is provided which is pivotally secured to the camera housing so as to be foldable over the flash cube mounting means when no flash cube is secured thereby and erectable to a position so as to provide a predetermined aperture through which light from the flash cube must pass in reaching a subject.

The cover means includes a plurality of generally rectangular telescoping apertured plates which are adapted to be sequentially advanced (so as to either increase or decrease the net aperture) by a cam and linkage assembly which is designed to effect a predetermined advance of said apertured plates as a function of the focus setting of said camera. A trim mechanism functions to advance said apertured plates independent of the focus setting of the camera and incorporates a cam and linkage assembly cooperable with the first-mentioned cam and linkage assembly.

Each of the telescoping apertured plates includes plural apertures such that their sequential advancement will effect a change in the illumination reaching the central portion of the subject as well as the size thereof and eliminate vignetting. Furthermore, one of the telescoping apertured plates is provided with tab means extending through the apertures in each of the other telescoping plates whereby illumination provided from the flash device to the subject will be uniformly distributed.

In another embodiment of the instant invention, the subject follow-focus photoflash lamp output modulator is provided as an attachment for use with a folding camera of the type described in U. S. Pat. No. 3,491,667, issued to E. H. Land, on Jan. 27, 1970, and commonly assigned herewith. Such a folding camera may typically include an objective lens associated with a shutter and a camera body and an erecting and focusing system for mounting the lens and shutter on the camera body and extending and retracting the lens along its axis to focus the lens in accordance with the camera-to-subject distance. Such an erecting and focusing system includes a movable member or focusing bar mounted on the upper forward portion of the camera body for movement transversely of the lens axis for focusing the lens.

When provided as an attachment, as above described, the subject invention may typically include a housing engageable with the camera body such that, with the lens axis of the camera horizontal, a flash cube may be operably secured to the camera body so as to extend vertically therefrom. A plurality of telescoping apertured plates are stacked in front of the flash cube so as to provide a predetermined aperture through which light may pass from the flash cube to a subject. Such telescoping apertured plates are essentially the same as those employed in the embodiment first described with the exception that they may not be folded over the cube retaining means.

A cam and linkage assembly is operably connected to the focusing bar whereby movement of the lens toward and away from the camera body will sequentially advance the telescoping apertured plates, toward or away from the camera body as the case may be, so as to effect a predetermined change in the net aperture, through which light from the flash cube may reach a subject, as a function of the range of said subject. As in the embodiment first described, trim means are provided for varying said net aperture independent of the range to the subject.

DESCRIPTION OF THE DRAWINGS

Other objects and many of the attendant advantages of the present invention will be better appreciated, and said invention will become clearly understood with reference to the following detailed description when considered in conjunction with the accompanying drawings illustrating two embodiments of the instant invention, wherein:

FIG. 2 provides a simplified exploded perspective of the aperture plates of the device of FIG. 1;

FIG. 3 provides a fragmentary perspective of the device of FIG. 1 showing the novel modulator thereof folded away from its erected position and providing a partially exploded illustration of the cam and linkage assembly interconnecting the camera focus adjusting means and the novel modulator;

FIG. 4 provides a fragmentary top plan of the aperture plates of FIGS. 1 – 3 partly in section and depicting the relationship between the apertured plates in a fully closed position;

FIG. 5 provides a simplified perspective of a second embodiment of the subject invention secured in operative relation to a folding camera;

DETAILED DESCRIPTION OF THE INVENTION

Figure 1:
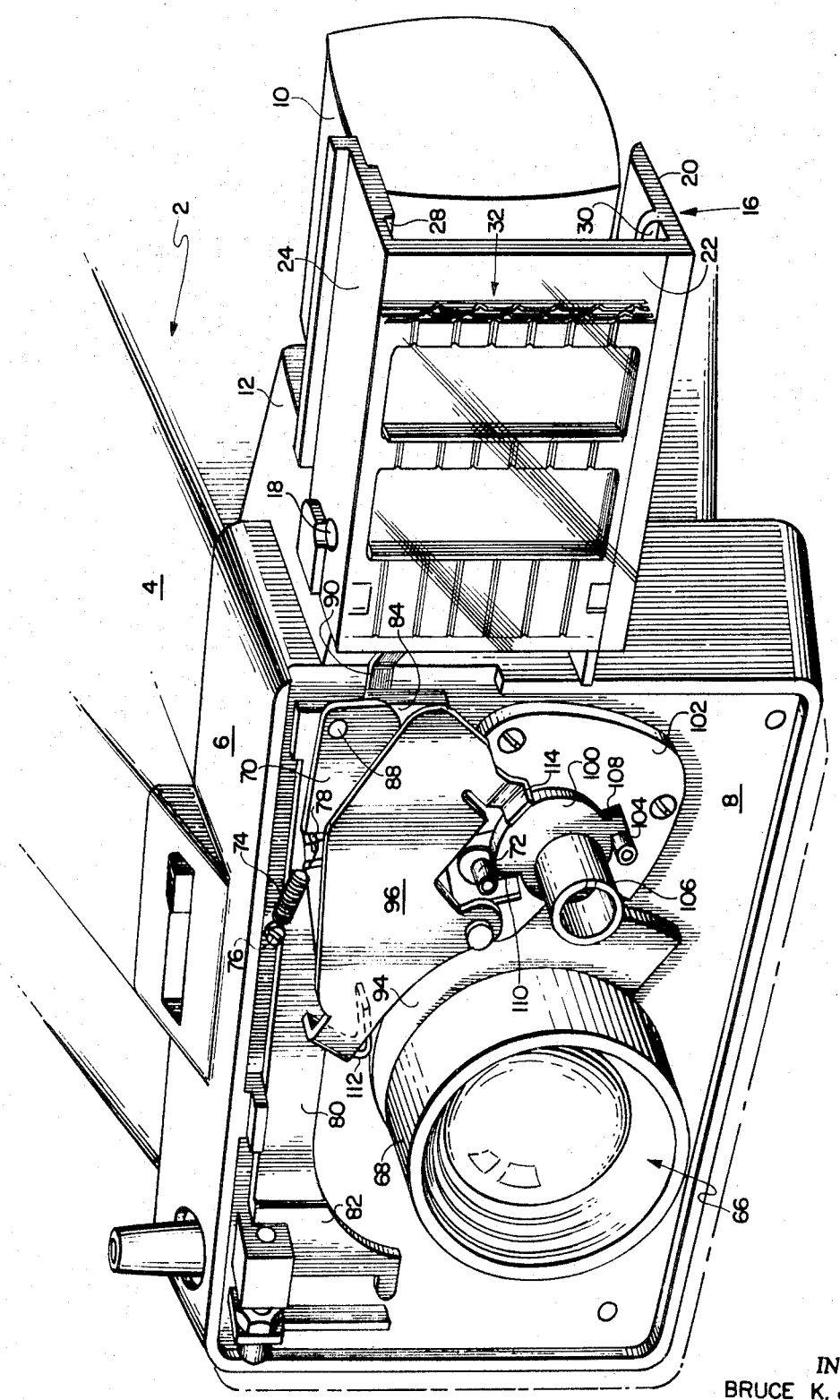
FIG. 1 provides a fragmentary perspective illustrating a first embodiment of the invention operatively secured to a photographic camera and in its erected position.

Referring to the drawings in more detail and, more particularly to FIG. 1, a non-folding box-type camera is shown generally at 2 including a body portion 4 which extends to a lens and shutter assembly housing 6 having an inner front wall 8.

A flash cube 10 is operatively and releasably secured to the camera 2 via a flash cube mounting assembly 12 which is of a type commonly employed in the art, such as the mounting assembly illustrated in U. S. Pat. Application, Ser. No. 41,681, filed May 25, 1970, by David E. Van Allen, and commonly assigned herewith. The flash cube mounting assembly 12 is itself secured to the lens and shutter assembly housing 6 of the camera 2 and, in a manner typically employed in the prior art, the flash cube 10 may be fired upon actuation of the camera shutter as by the shutter release button 14.

A generally U-shape foldaway cover assembly 16 is pivotally secured to the flash cube mounting assembly 12 as by pins 18 and 20 (FIG. 3). The foldaway cover assembly 16 is typically formed of transparent plastic and includes a generally rectangular front portion 22 and a pair of spaced parallel top and bottom portions 24 and 26, respectively, extending normally therefrom. The inner surfaces of said top and bottom portions 24 and 26 are so configured that, in conjunction with the inner surface of the front portion 22, they define a pair of longitudinally extending spaced parallel slots 28 and 30, respectively.

An array of apertured plates 32 are disposed within the slots 28 and 30 adjacent the inner face of the front portion 22 of the foldaway cover assembly 16. The individual apertured plates of the array 32 are arranged in overlying relationship so as to be slideable with respect to each other within said slots 28 and 30.

It should be noted at this point that the number of apertured plates may be varied to suit any particular requirements and for purposes of illustration, each of the embodiments of the novel follow-focus photoflash lamp output modulator herein disclosed will be described for an array comprising four apertured plates.

As best seen in FIG. 2, the array 32 is seen to comprise a forwardmost apertured plate 34 which is, as best seen in FIGS. 1, 3, and 4, fixedly disposed within the slots 28 and 30 (immediately adjacent the inner face of the front portion 22 of the foldaway cover assembly 16). A second apertured plate 36 is positioned behind the apertured plate 34 and is slideable with respect thereto. Similarly, a third apertured plate 38 is slideably disposed within the slots 28 and 30 behind the apertured plate 36, and a fourth apertured plate 40 is slideably disposed within the slots 28, 30 behind the apertured plate 38.

Each of the apertured plates 34, 36, 38, and 40, is provided with a pair of spaced parallel generally rectangular apertures 42 and 44, with each and every pair of apertures 42 and 44 being congruent. The apertures 42 and 44 are disposed within each of the apertured plates 34, 36, 38, and 40 so as to define an inner edge portion 46, a central portion 48, and an outer edge portion 50.

Looking more closely to the apertured plate 34 of FIG. 2, it is seen that a plurality of longitudinally directed, spaced parallel indentations are formed in the forwardly directed surface of the inner and outer edge portions 46 and 50 and the central portion 48 thereof. The indentations 52 on the inner and outer edge portions 46 and 50, respectively, and the central portion 48 of the plate 34 are aligned and are sufficiently deep whereby they appear on the rearwardly directed surface of said portions 46, 48, and 50 as ridges 54.

In a like manner, similar indentations 52 and ridges 54 are formed on the forward and rearwardly directed surfaces, respectively, of the portions 46, 48, and 50 of the apertured plate 36, with the indentations 52 and the ridges 54 of said apertured plate 36 being arranged to extend between the indentations 52 and the ridges 54 of the aperture plate 34. Similarly, the apertured plate 38 is provided with indentations 52 and ridges 54 on the forward and rearwardly directed surfaces, respectively, of the portions 46, 48, and 50 thereof.

The indentations 52 and the ridges 54 of the apertured plate 38 are disposed to extend between the indentations 52 and the ridges 54 of the apertured plate 36. The ridges 54 function to maintain the apertured plates 34, 36, 38, and 40 in predetermined spaced relation whilst minimizing friction (so as to enable them to slide longitudinally relative to one another). Obviously, the rearwardmost plate 40, not supporting a succeeding apertured plate, need not be provided with indentations 52 and ridges 54 as aforesaid.

It should be emphasized at this point that each of the apertured plates 34 – 40 are constructed of opaque material and that the width of the inner edge portion 46, the central portion 48, and the outer edge portion 50 in the direction of the indentations 52 is the same for each of the apertured plates 34 – 40.

The inner edge portion 46 of each of the plates 34, 36, 38, and 40 is provided with a pair of symmetrically positioned oppositely directed upper and lower tabs 56. Also, each of the apertured plates 34, 36, and 38 is provided with a pair of symmetrically disposed inwardly directed upper and lower tabs 58 on its inner edge portion 46. It should be noted that the vertical positioning of each of the inwardly directed tab portions 58 on the respective inner edge portions 46, of the apertured plates 34, 36, and 38, are staggered whereby when said apertured plates 34, 36, and 38 are disposed in overlying relationship, their respective tab portions 58 will not interfere with one another. Additionally, the oppositely directed tab portions 56 of each of the apertured plates 34, 36, 38 and 40 are so vertically positioned, on their respective inner edge portions 46, whereby relative movement of the apertured plate 40 outward of the lens and shutter assembly housing 6 will cause its oppositely directed tab portions 56 to engage the inwardly directed tab portions 58 of the apertured plate 38.

Further movement of the apertured plate 40 (outward of said housing 6) will cause the apertured plate 38 to move outward of the lens and shutter housing assembly 6 until its oppositely directed tab portions 56 engage the inwardly directed tab portions 58 of the apertured plate 36.

It will be recalled that the apertured plate 34 is fixedly secured within the foldaway cover assembly 16 and, therefore, no further relative movements of the apertured plates 40, 38, and 36 outward of the lens and shutter assembly housing 6 will be possible.

It should be further noted that the distance between the oppositely directed tab portions 56 and the inwardly directed tab portions 58 for the apertured plates 34, 36, and 38, and location of the outwardly directed tab portions 56 on the inner edge portion 46 of the apertured plate 40 (which is not provided with inwardly directed tab portions 58) are precisely predetermined such that when said apertured plate 40 is at its furthest position, outward of the lens and shutter assembly housing 6, the apertures 42 and 44 of the apertured plate 34 will be completely covered by the opaque portions of the apertured plates 36, 38 and 40.

As best seen in FIGS. 2, 3, and 4, the apertured plate 40 is provided with a rearwardly extending connecting tab 60 affixed to the rearward surface of the inner edge portion 46. The connecting tab 60 is provided with a generally rectangular opening 62 extending therethrough for connection with a cam and linkage assembly to be described in more detail, infra.

The apertured plate 40 is further provided with a pair of forwardly directed tabs extending the entire length of the longitudinal edges of the apertures 42 and 44, respectively, closest to the inner edge portion 46. The tabs 64 extend forwardly of the apertured plate 40 an amount sufficient to extend through the apertures 42 and 44 of the apertured plates 38, 36, and 34, when all of the said apertured plates 34, 36, and 38, and 40 are positioned in overlying relationship (within the slots 28 and 30 of the foldaway cover assembly 16). Whilst the forwardly directed tabs 64 extend through the aperture plates 38, 36, and 34, they do not extend beyond the forwardmost face of the apertured plate 34.

Inasmuch as the aperture plates 34 – 40 are disposed in overlying relationship, the edges of the respective apertured plates defining the net aperture through which light from the flash cube 10 may be transmitted to a subject will lie in different planes. Hence, the illumination will not be uniform across the subject effecting a degradation in the quality of the photographic image reproduction. However, the forwardly directed tabs 64 minimize the affect of the apertured plates 34 – 40 lying in different planes and serve to greatly improve the uniformity of the illumination of the subject by the flash cube 10.

As best seen in FIGS. 1 and 3, the camera 2 is provided with a lens assembly 66 rotatably secured to the inner front wall 8. The lens assembly 66 includes a focusing ring 68 which is rotatably secured to the inner front wall 8 whereby the lens assembly 66 may be focused by rotation of the focusing ring 68.

A lever arm 70 is pivotally secured at one end to the inner front wall 8 of the lens and shutter assembly housing 6, as by a pin assembly 72. A spring 74 is connected to the inner front wall 8, as by screw means 76 and is secured to the lever arm 70 at a position 78 remote from said pin assembly 72. The spring 74 is preloaded so as to bias said lever arm 70 counterclockwise about the pin assembly 72.

An arm 80 is secured to the upper portion of the inner front wall 8 of the lens and shutter assembly housing 6 in a well-known manner whereby said arm 80 may slide linearly across said front wall 8. The arm 80 extends across the front wall 8 of the housing 6 and terminates in an end portion 82 at one end and extends toward said flash cube mounting assembly 12 to terminate in an end portion 84 at its other end. The end portion 84 is provided with a linear upwardly extending slot 86 and the lever arm 70 is pivotally connected to the arm 80 by means of a pin assembly 88 which is pivotally and slideably secured to the arm 80 within the slot 86 in the end portion 84.

Thus, pivotal movement of the lever arm 70 about the pin assembly 72 will cause the pin assembly 88 to linearly traverse the slot 86 whilst linearly driving the arm 80 across the inner front wall 8 of the lens and shutter assembly housing 6 in a direction depending upon the direction of pivotal movement of the lever arm 70.

A connecting link 90 is connected at one end to the end portion 84 of the arm 80 and extends outwardly thereof to bent tab portion 92 which is received within the opening 62 in the rearwardly extending connecting tab 60. The bent tab portion 92 is of suitable size and shape such that it will engage the connecting tab 60 and cause the apertured plate 40 to be moved within the slots 28 and 30 toward the end of said cover assembly 16 closest the pins 18 and 20 when said foldaway cover assembly 16 is in its folded position (as best seen in FIG. 3). With the cover assembly 16 erected (as best seen in FIG. 1) the bent tab portion 92 will engage the connecting tab 60 such that pivotal movement of the lever arm 70 about the pin assembly 72 will effect linear movement of the arm 80 and, hence, the apertured plate 40 so as to sequentially actuate the apertured plates 38, 36, and 34.

A profile cam 94 of precisely predetermined shape is secured to the periphery of the focusing ring 68 so as to be rotatable therewith. A cam follower 96 is pivotally secured to the lever arm 70 at a position eccentric of the pin assembly 72, as by a pin assembly 98. A second profile cam 100 is rotatably secured to the inner front wall 8 of the lens and shutter assembly housing 6 via a support plate 102 which is provided with a stop 104 in the form of a lug projecting normally outward therefrom. The cam 100 is rotated by means of a cylindrical control knob 106 and is provided with a tab portion 108 extending radially outward from its peripheral surface so as to engage the stop 104 to thereby limit the clockwise travel of said cam 100. The abrupt rise of the cam surface defines a shoulder 110 which comes into abutment with the stop 104 to prevent or limit counterclockwise rotation of the cam 100.

The cam follower 96 includes an end portion 112 suitably configured to ride upon and follow the peripheral surface of the profile cam 94. Similarly, the cam follower 96 extends to an end portion 114, remote from said end portion 112, and configured to ride upon and follow the peripheral surface of the profile cam 100. The end portions 112 and 114 are biased into engagement with the peripheral surfaces of the profile cams 94 and 100, respectively, by the spring 74 which biases the lever arm 70 in a counterclockwise direction about the pin assembly 72 which, in turn, biases the cam follower 96 counterclockwise about said pin assembly 72 by virtue of its pivotal connection to the pin assembly 98 eccentric of the pin assembly 72.

In operation, focusing the lens assembly 66 will be effected by rotation of the focusing ring 68 carrying therewith the profile cam 94 which, in turn, will cause the cam follower 96 to rotate the pin assembly 98 and, hence, the lever arm 70, about the pin assembly 72. Rotation of the lever arm 70 about the pin assembly 72 will cause the pin assembly 88 to simultaneously move upward within the slot 86 and move the arm 80 toward the flash cube mounting assembly 12.

Such movement of the arm 80 will cause the connecting link 90 to move outward of the housing assembly 6, and with the foldaway cover assembly 16 in its erected position, the connecting link 90 will advance the apertured plate 40 via the connecting tab 60 thereof (which is in engagement with the bent tab portion 92 of said connecting arm 90).

As the apertured plate 40 is advanced, the oppositely directed tabs 56 thereof will engage the inwardly directed tabs 58 of the plate 38. In a similar manner, further advancement of the plate 40 will cause the oppositely directed tabs 56 of the apertured plate 38 to engage the inwardly directed tabs 58 of the apertured plate 36 and such advance of the apertured plates will continue until the oppositely directed tabs 56 of the apertured plate 36 engage the inwardly directed tabs 58 of the fixed apertured plate 34.

As best seen in FIG. 4, when the apertured plates 36, 38, and 40 have advanced outward of the lens and shutter assembly housing 6 as far as possible, the apertures 42 and 44 of the apertured plate 34 will be completely covered. At this time, the area of the front portion 22 of the foldaway cover assembly 16 outward of the apertured plate 34 will likewise be covered by the advanced apertured plates 40, 38, and 36.

In a similar manner, clockwise rotation of the focusing ring 68 and the profile cam 94 will cause the lever arm 70 to pivot counterclockwise about the pin assembly 72 causing the pin assembly 88 to simultaneously move upward in the slot 86 and carry the end portion 84 and the arm 80 across the inner front wall 8 in a direction away from the flash cube mounting assembly 12. Such movement of the arm 80 will cause the apertured plate 40 to advance in the opposite direction toward the flash cube mounting assembly 12.

As the apertured plate 40 is advanced toward the mounting assembly 12, the forwardly directed tab 64 will successively engage the edges of the apertures 42 and 44, of the apertured plates 38, 36, and 34, respectively, closest to the inner edge portions 46 until all of said apertured plates are positioned with their respective apertures 42 and 44 in registration in the fully opened position, as illustrated in FIG. 1.

For any particular setting of the focusing ring 68, the apertured plates 34 – 40 will be relatively positioned so as to define a predetermined net aperture as a function of the cam 94. For any particular position of the focusing ring 68 and the cam 94, the cam 100 may be actuated by the control means 106 to vary the net aperture through which light from the flash cube 10 may be transmitted to a subject. For example, rotation of the control knob 106, and the second profile cam 100 therewith, will cause the cam follower 96 to pivot about the point of contact between the end portion 112 and the cam 94, thereby causing the lever arm 70 to pivot about the pin assembly 72 to actuate the arm 80 and, hence, the apertured plate 40.

Rotation of the control knob 106 and the second profile cam 100 clockwise will decrease the net aperture defined by the apertured plates 34 – 40 independent of the setting of the focusing ring 68 and the profile cam 94. Similarly, rotation of the control knob 106 and the profile cam 100 in the counterclockwise direction will increase the net aperture defined by said apertured plates 34 – 40 independent of the focus setting of the lens assembly 66 and the cam 94 operatively connected therewith.

Referring now to FIGS. 5 – 8 and, more particularly to FIG. 5, another embodiment of the subject invention is illustrated in combination with a camera 116 of the hand-held folding type. The camera 116 includes a camera body 118, a lens and shutter assembly 120, and expandable and collapsible bellows 122 coupling the lens and shutter assembly 120 to the camera body 118, and an erecting system comprising two linkages 124 and 126 for supporting the lens and shutter assembly 120 relative to the camera body 118. The lens designated 128, of the lens and shutter assembly 120, is fixed with respect to the assembly of which it is a component, and the focusing of the lens 128 is achieved by moving said lens and shutter assembly 120 relative to the camera body 118 along the axis of the lens 128 by manipulating the linkages 124 and 126 (which serve to support the lens and shutter assembly 120).

The erecting and focusing system of the camera 116 is of the type shown and more fully described in detail in U. S. Pat. No. 3,185,060, issued May 25, 1965, to R. S. Borghesani, and commonly assigned herewith. Briefly, the linkage 124 comprises a first link 130 pivotally connected at one end to the lens and shutter assembly 120 and pivotally engaged at its other end by a movable member 132 mounted on the camera body 118 for reciprocating motion transverse the axis of the lens 128; and a second link 133 pivotally connected at one end to said first link 130 intermediate the ends of the latter and pivotally connected at its other end to the camera body 118.

The linkage 126 includes a first link 134 pivotally connected at one end to the lens and shutter assembly 120 and slideably engaged at its other end in a track 136 on the camera body 118; and a second link 138 pivotally connected intermediate its ends to the first link 134 intermediate the ends of the latter and pivoted at one end to the camera body 118 and engaged at its other end in a track (not shown) on the rear of the lens and shutter assembly 120. The construction is such that the rear ends of the links 130 and 134 and the forward end of the link 138 may be reciprocated in generally parallel relation transverse the axis of the lens 128 to extend and retract said lens and shutter assembly 120 along the lens axis for the purpose of folding and unfolding the camera 116 and focusing the lens 128.

To facilitate the focusing of the lens 128, the movable member 132 is provided, on opposite end portions, with buttons 140 adapted to be engaged by the index fingers of the operator for reciprocating the movable member 132 and focus the lens 128 by extending and retracting the lens and shutter assembly 120. The camera 116 also includes a viewfinder 142 which typically may incorporate a rangefinder coupled with the movable member 132.

The subject invention is shown incorporated with a novel flash cube retaining and indexing mechanism 144 which is more fully described in copending U.S. application, Ser. No. 101,337 filed by John B. Morse on Dec. 24, 1970. The retaining and indexing assembly 144 is separate from and may be attached to the camera 116 by means of an attachment assembly 146 (which may typically comprise a spring clip or a foot and shoe assembly) such as is commonly employed in the art. The retaining and indexing assembly 144 may also be provided with plug means (not shown) for attachment to the camera 116 such that the flash cube will be fired synchronously with the opening of the camera shutter upon actuation of the shutter release 148.

The flash cube retaining and indexing mechanism 144 includes a rear portion 150 and a front portion 152. A flash cube 154 is rotatably and releasably secured within the retaining and indexing mechanism 144 between the front portion 152 and the rear portion 150.

Figure 6:
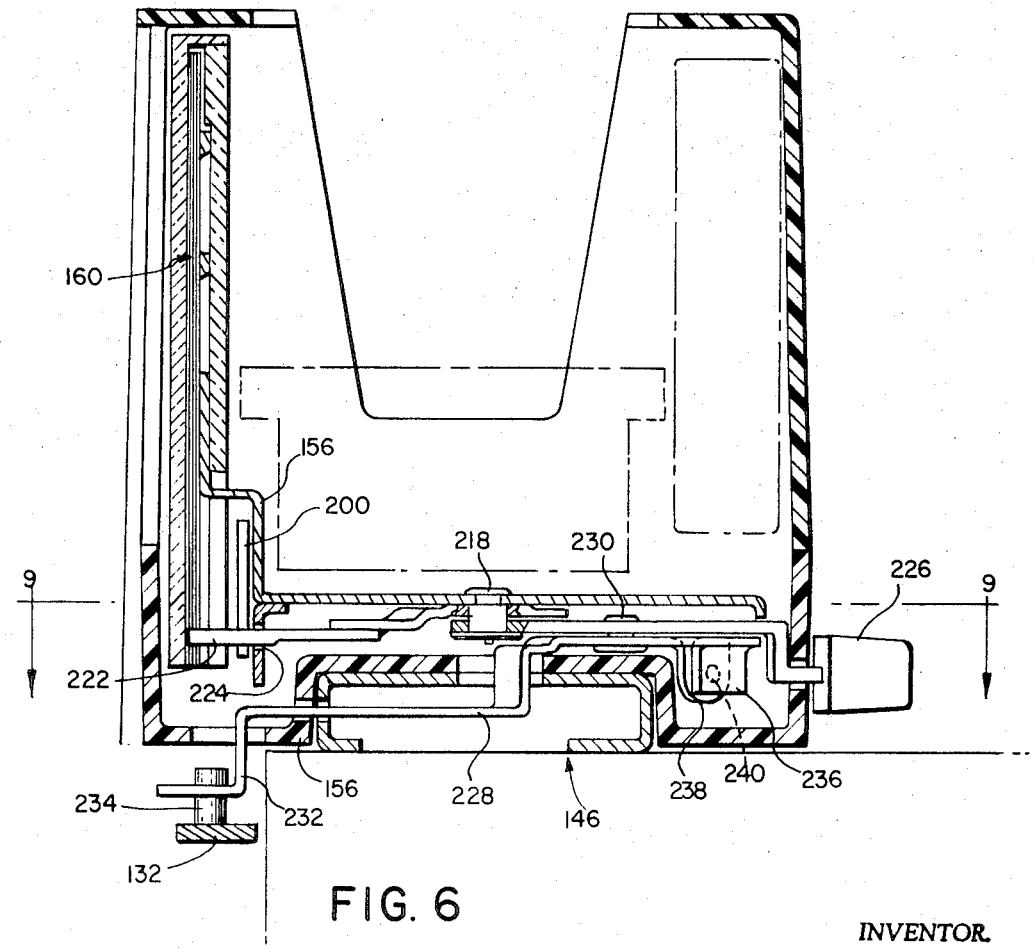
FIG. 6 provides a side elevation of the modulator of FIG. 5 partly in section.
Figure 7:
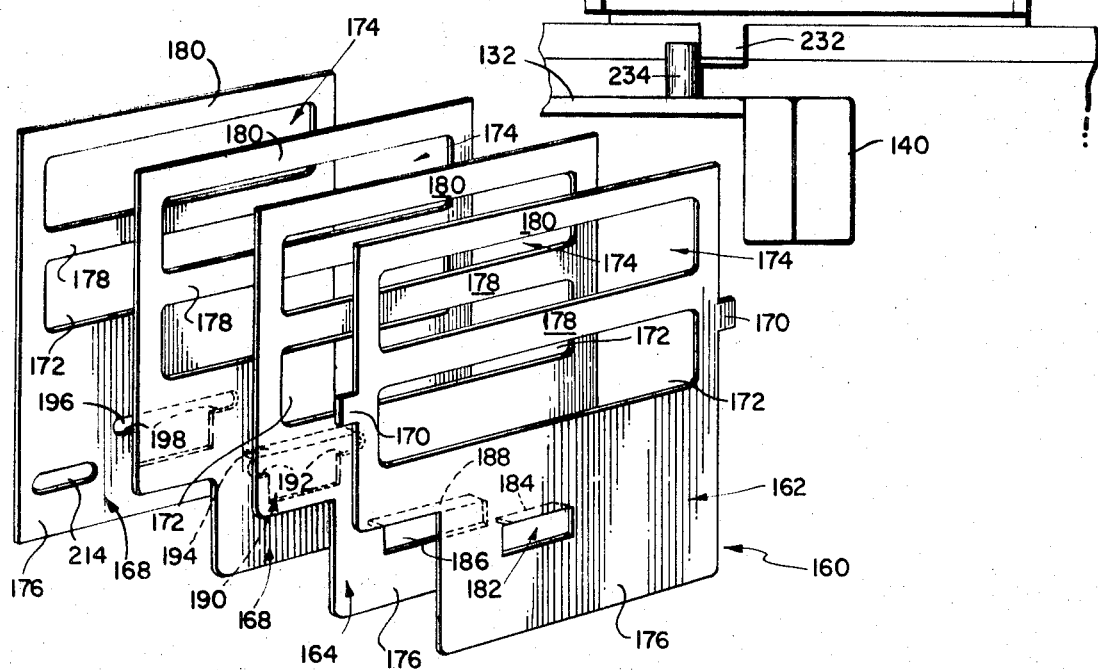
FIG. 7 provides a simplified exploded perspective of the apertured plates of the device of FIG. 5.

As best seen in FIG. 6, the flash cube retaining and indexing mechanism 144 includes a stationary frame member 156 to which is affixed the attachment assembly 146. A clear plastic cover assembly 158 is secured to the stationary frame member 156 within the front portion 152 of the flash cube retaining and indexing mechanism 144. An array of aperture plates 160 is slideably disposed within the plastic cover assembly 158 and, as best seen in FIG. 7, comprises a plurality of apertured plates 162, 164, 166, and 168 which are disposed in overlying relationship within the cover assembly 158 (FIG. 6).

The array of apertured plates 160 is similar to the array of apertured plates 32 (FIG. 1) in both function and appearance. The apertured plate 162 is mounted forwardmost within the cover assembly 158 and is provided with a pair of oppositely directed ears 170 which function to fixedly secure said apertured plate 162 within the cover assembly 158. In a manner similar to the apertured plates 36, 38, and 40, (FIG. 2) the apertured plates 164, 166, and 168 are successively disposed rearward of the fixed aperture plate 162 and are each slideable within the cover assembly 158 relative to one another and to said fixed apertured plate 162.

Each of the apertured plates 162 – 168 is provided with a pair of spaced parallel generally rectangular apertures 172 and 174, with each and every pair of apertures 172 and 174 being congruent. The apertures 172 and 174 are disposed within each of the apertured plates 162, 164, 166, and 168 so as to define a lower edge portion 176, a central portion 178, and an upper edge portion 180.

It should be emphasized at this point that each of the apertured plates 162 – 168 is constructed of opaque material and that the width of the lower edge portion 176, the central portion 178, and the upper edge portion 180 (in the direction of movement of the apertured plates 164 – 168) is the same for each of said apertured plates 162 – 168.

Further, it will be noted that the apertured plates 162 – 168 have not been illustrated with indentations and ridges such as the indentations 52 and ridges 54 of the apertured plates 34 – 40 (of FIG. 2). While such indentations and ridges are not essential for the proper functioning of the invention, it should nevertheless be understood that the apertured plates 162 – 166 may be provided with ridges and indentations to facilitate their efficient operation.

The lower edge portion 176 of the apertured plate 162 is provided with a generally rectangular opening 182 having an inwardly directed tab 184 extending from the upper longitudinal edge thereof. In a similar manner, the apertured plate 164 is provided with a generally rectangular opening 186 having an inwardly directed tab 188 extending from the upper longitudinal edge thereof.

The apertured plate 166 includes a generally T-shape opening 190 in the lower edge portion 176 thereof which is so configured as to define a pair of inwardly extending shoulders 192. The T-shape opening 190 includes an inwardly directed tab portion 194 extending from the uppermost edge thereof. Similarly, the apertured plate 168 is provided with a T-shape opening 196 in the lower edge portion 176 thereof which is so configured as to define a pair of inwardly extending shoulders 198.

The longitudinal extent of the openings 182 and 186 and the distance between the inwardly extending shoulders 192 and 198 progressively increases from the apertured plate 162 to the apertured plate 168. Also, the width (in a direction of the longitudinal extent of the openings 182 and 186) of the inwardly directed tab portions 184, 188, and 194, respectively, progressively increases in correspondence to the increase in the width of the openings 182 and 186 and the distance between the inwardly extending shoulder portions 192 and 198.

Accordingly, upward movement of the apertured plate 168 will cause the inwardly directed tab portion 194 of the apertured plate 166 to engage said inwardly extending shoulders 198 whereupon said apertured plate 166 will move with said apertured plate 168 as said apertured plate 168 continues its upward movement within the front portion 152 of the flash cube retaining and indexing mechanism 144.

Continued upward movement of the apertured plate 166 will cause the inwardly directed tab 188 of the aperture plate 164 to engage the pair of inwardly extending shoulders 192 whereby said apertured plate 164 will thereafter move upward with said apertured plate 166.

Further upward movement of the apertured plates 168, 166, and 164 will eventually bring the inwardly directed tab 184 of the apertured plate 162 into engagement with the lower longitudinally extending edge of the rectangular opening 186. At this time, no further upward movement of the apertured plates 168, 166, and 164 will be possible because the apertured plate 162 is fixedly secured within the front portion 152 of the flash cube retaining and indexing mechanism 144.

In a similar manner, downward movement of the apertured plate 168 will successively cause the inwardly directed tab 194 to engage the uppermost edge of the T-shape opening 196, and the inwardly directed tab 188 to engage the uppermost edge of the T-shape opening 190, whereby the apertured plates 166 and 164 will follow the downward movement of the apertured plate 168 until such time as the inwardly directed tab 184 engages the uppermost edge of the rectangular opening 186 in the apertured plate 164.

Figure 8:
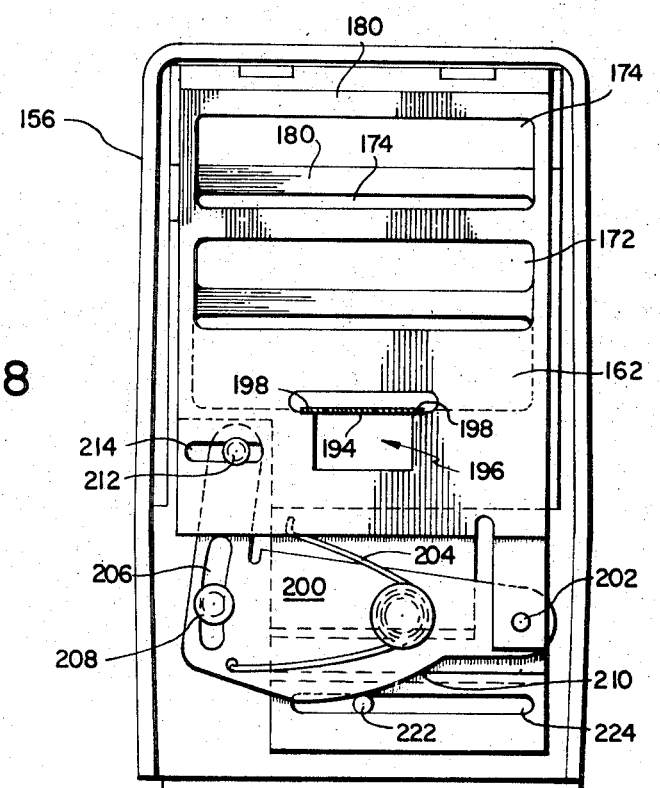
FIG. 8 provides a simplified fragmentary front elevation of the modulator assembly of the device of FIG. 5.

As best seen in FIGS. 6 and 8, a lever arm 200 is pivotally secured to the stationary frame member 156 as by a pin 202. The lever arm 200 is biased counterclockwise about the pin 202 by a torsion spring 204, the leg portions of which are connected to the stationary frame member 156 and said lever arm 200, respectively. The lever arm 200 is further provided with an arcuate slot 206 adapted to receive a guide pin 208 which is affixed to the frame member 156 and functions to guide the pivotal movement of the lever arm 200 about the pin 202.

A portion of the lower edge of the lever arm 200 is provided with a cam surface 210 and one end portion of said lever arm 200 is provided with a pin member 212 which is rotatably and slideably received within a slot 214 (FIGS. 7 and 8) in the rearmost apertured plate 168.

Figure 9:
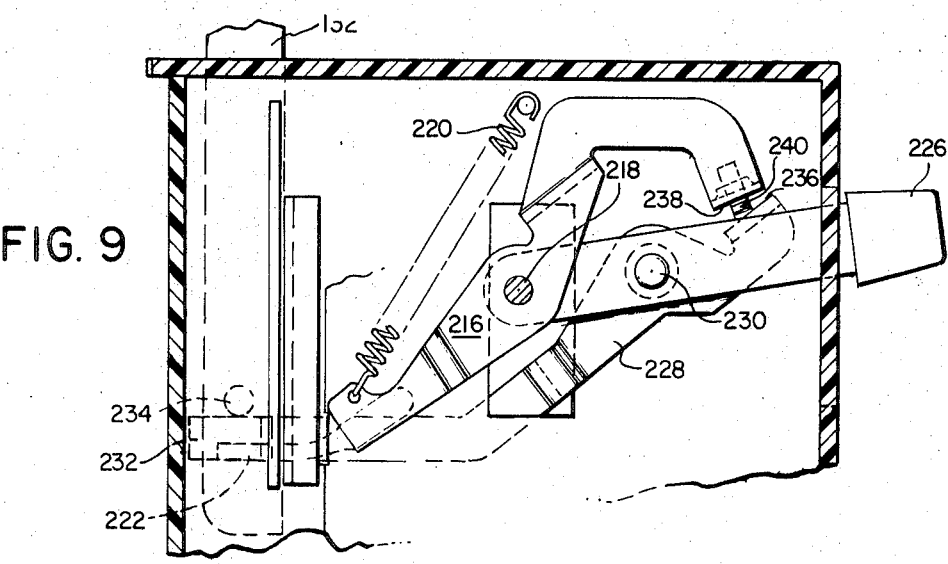
FIG. 9 provides a top plan illustrating a portion of the trim control and follow-focus linkage mechanisms of the device of FIG. 5.

As best seen in FIGS. 6, 8, and 9, a link arm 216 is pivotally secured to the frame member 156 as by a pin 218 for pivotal movement in a plane normal to the plane of the array of aperture plates 160. The link arm 216 is biased for clockwise movement as by a tension spring 220, one end of which is secured to said frame member 156 and the other end of which is secured to one end portion of said link arm 216 in a well-known manner.

The link arm 216 extends to a generally cylindrical end portion 222 which, in turn, extends through a slot 224 in the front portion of the stationary frame member 156. The slot 224 extends laterally across the front portion of the stationary frame member 156 and is parallel to the movable member 132 whereby the cylindrical end portion 222 may traverse said slot 224 in response to pivotal movement of said link arm 216. The cylindrical end portion 222 of the link arm 216 engages the cam surface 210 of the lever arm 200 due to the biasing of said lever arm 200 by said torsion spring 204, as aforesaid.

A trim control link 226 is pivotally secured to said stationary frame member 156 beneath said link arm 216 and at the pivotal center thereof as by said pin 218 such that said trim control link 226 may pivot within a plane parallel to that of said link arm 216. A driving link 228 is pivotally secured to the trim control link 226 outward of the pin 218 as by a pin 230.

The driving link 228 extends beneath the front portion 152 of the flash cube retaining and indexing mechanism 144 to a generally L-shape end portion 232 which engages a tab 234 which is affixed to and extends upward from the moveable member 132.

The end portion of said driving link 228 remote from said L-shape end portion 232 extends to a bearing surface 236 which extends beneath and normal to the plane of rotation of said driving link 228. The end portion of the link arm 216 remote from said cylindrical end portion 222 terminates in a bearing surface 238 which depends therefrom generally normal to the plane of rotation of said link arm 216.

An adjusting screw 240 is threadably received within the bearing surface 238 such that the portion of said adjusting screw 240 extending outward of said bearing surface 238 may be varied as desired. The adjusting screw 240 serves to space the bearing surface 236 a predetermined distance from the bearing surface 238 such that movement of said driving link 228 a predetermined amount will cause said cylindrical end portion 222 of said link arm 216 to move to a predetermined position dependent upon both the amount of movement of said driving link 228 and the setting of said adjusting screw 240.

The link arm 216 is caused to follow the driving link 228 because of the bias exerted on said link arm 216 by said tension spring 220. Also, movement of the trim control link 226 will cause the driving link 228 to pivot with the trim control link 226 about the pin 218 thereby moving the bearing surface 236 away from said bearing surface 238. The tension spring 220, however, will cause the adjusting screw 240 to remain in contact with said bearing surface 236 and said end portion 222 will be adjusted a predetermined amount by the movement of said trim control link 226, as aforesaid.

It will be recalled that the camera 116 of FIG. 5 is focused by means of reciprocating the movable member 132 via the buttons 140. Also, it should be noted that the L-shape end portion 232 of the driving link 228 is biased into engagement with the tab portion 234 extending upward from said movable member 132 by means of the tension spring 220 acting through the link arm 216. Thus, reciprocal movement of the movable member 132 will cause the driving link 228 to pivot about the pin 230 so as to maintain said end portion 232 in engagement with said tab 234.

Pivoting of the driving link 228 responsive to reciprocal movement of said movable member 132 will be followed by pivotal movement of the link arm 216 about the pin 218 causing the cylindrical end portion 222 to traverse the slot 224 in the direction of movement of said movable member 132. Such movement of the cylindrical end portion 222 will cause it to traverse the cam surface 210 of the lever arm 200 causing the latter to pivot about the pin 202 causing the pin member 212 to simultaneously pivot about the pin 202 and traverse the slot 214 thereby moving the apertured plate 168 upward or downward depending on the direction of movement of said end portion 222 within said slot 224.

As the range of a subject decreases, proper focusing of the camera 116 is achieved by moving the member 132 to the right of a user facing the subject. When this occurs, the end portion 222 will slide along the cam surface 210 causing the lever arm 200 to pivot against the spring 204 causing the apertured plates 168, 166, and 164 to successively move upward so as to decrease the opening available to admit light from the flash cube 154 to the subject. Analogously, as the range of the subject increases, the camera 116 is focused by moving the member 132 to the left (of the user facing the subject) whereupon the end portion 222 traverses the slot 224 and the spring 204 will pivot the lever arm 200 about the pin 202 so that the cam surface 210 maintains engagement with said end portion 222. Thus, as the range of the subject increases, the apertured plates 168, 166, and 164 will move successively downward so as to increase the opening or effective aperture available for the passage of illumination from the flash cube 154 to the subject.

It is to be emphasized at this point that the cam surface 210 is of such shape and the various components of the flash cube retaining and indexing mechanism 144 are so configured that the net aperture effected by the movement of said apertured plates 164 – 168 in response to reciprocal movement of said movable member 132 will provide appropriate illumination for the subject being photographed as a function of the range thereof.

It should be further noted that for any particular focus setting of the camera 116 and, hence, the movable member 132, the effective aperture provided by the array of apertured plates 160 may be selectively increased or decreased by means of the trim control link 226. For example, clockwise rotation of the trim control link 226, as seen in FIG. 9, will cause the apertured plates 164, 166, and 168 to move upward so as to decrease the effective aperture provided thereby and lower the amount of illumination reaching the subject.

Analogously, counterclockwise rotation of the trim link 226 will cause the lever arm 200 to pivot counterclockwise about the pin 202 and cause the apertured plates 168, 166, and 164 to successively move downward, thereby increasing the effective aperture available for the passage of illumination from the flash cube 154 to the subject. Thus, independent of the range of the subject and the net aperture provided by the array of apertured plates 160 responsive thereto, the subject may be lightened or darkened by appropriate movement of the trim control link 226.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is therefore to be understood that within the scope of the appended claims, the instant invention may be practised in a manner otherwise than is specifically described herein.

What is claimed is:

1. Photo-flash modulation apparatus for use with a camera, including:
    a housing; an array of apertured plates telescopically arranged and movably secured within said housing and cooperable to define a variable aperture for the passage of light; and
    means for sequentially advancing said array of apertured plates a predetermined amount to define a predetermined aperture as a function of the range of a subject.

2. The invention as delineated in claim 1, further including means for selectively and uniformly modulating the illumination reaching a subject from photo-flash means as a function of said range.

3. The invention as stated in claim 2, wherein said selectively and uniformly modulating means includes means defining plural spaced apertures with both the area of said apertures and the spacing therebetween varying as a predetermined function of said range.

4. The invention according to claim 3, wherein said plural spaced aperture defining means includes plural spaced apertures in each apertured plate comprised in said array of aperture plates.

5. The invention in accordance with claim 4, wherein the plural spaced apertures in each said apertured plate are identical in size and spacing.

6. The invention as recited in claim 1, wherein one of said array of apertured plates is fixedly secured with respect to said housing.

7. The invention as related in claim 5, wherein one of said array of apertured plates is fixedly secured with respect to said housing.

8. The invention as described in claim 7, further including means for selectively advancing a first of said apertured plates a predetermined amount as a function of said range; and
    means connected to at least a second of said apertured plates for engaging said first of said apertured plates upon advancement thereof of a predetermined amount.

9. The invention as set forth in claim 8, wherein said first of said apertured plates includes plural tabs each defining one edge of a different one of said plural apertures in said first apertured plate and extending through the corresponding aperture of each of the other apertured plates.

10. The invention as set out in claim 9, wherein at least one of said apertured plates is provided with a plurality of spaced ridges on one surface thereof which function to slideably space such apertured plate from another of said apertured plates.

11. The invention according to claim 10, further including means for selectively and uniformly modulating the illumination reaching a subject independent from the range thereof.

12. The invention as related in claim 11, wherein said camera is provided with means for releasably securing a photo-flash lamp and said housing includes foldaway cover means adapted to be erected from a first position covering said releasably securing means to a position wherein light directed toward said subject from said photo-flash lamp will pass therethrough.

13. The invention as recited in claim 12, wherein said camera is provided with focus adjusting means and further including means coupled to said focus adjusting means and to said means for moving at least one of said array of apertured plates, whereby said array of apertured plates will define a predetermined aperture as a function of the focus setting of said camera.

14. The invention as set out in claim 13, wherein said focus adjusting means includes a focusing ring and said means coupled to said focus adjusting means includes:
    a profile cam disposed about the periphery of said focusing ring;
    a cam follower in engagement with said cam and pivotally connected to said camera; and
    an arm connected to said cam follower and to said means for moving at least one of said array of apertured plates.

15. Photo-flash modulation apparatus for use with a camera having focus adjusting means, including:
    a support;
    receiving means connected to said support for securing a lamp to illuminate a subject;
    foldaway cover means disposed outward of said receiving means so as to define a window;
    an array of apertured plates movably secured within said cover means and cooperable to vary the size of said window; and
    means actuable in accordance with the camera-to-subject distance for moving at least one of said array of apertured plates and thereby selectively blocking portions of the illumination from said lamp by varying the size of said window.

16. The invention as delineated in claim 15, wherein said array of apertured plates are telescopically arranged whereby they may be sequentially advanced as a function of said camera-to-subject distance.

17. The invention as stated in claim 16, wherein each of said array of apertured plates includes plural spaced apertures and wherein said apertured plates cooperate to define plural spaced apertures with both the area and the spacing between said defined apertures varying as a predetermined function of said camera-to-subject distance.

18. The invention in accordance with claim 17, including cam means connected to said focus adjusting means for effecting the sequential advancement of said apertured plates as a function of the setting of said focus adjusting means.

19. The invention in accordance with claim 18, including second cam means for varying both the size of and the spacing between said plural aperture defined by said array of apertured plates independent of the setting of said focus adjusting means.

20. The invention as set forth in claim 1, wherein said camera is provided with focus adjusting means and further including means coupled to said focus adjusting means and to said means for moving at least one of said array of apertured plates, whereby said array of apertured plates will define a predetermined aperture as a function of the focus setting of said camera.

21. The invention according to claim 20, wherein said camera includes a camera body, an objective lens and mounting means for said lens movable relative to said body along the axis of said lens for focusing said lens.

22. Photo-flash modulation apparatus adapted for use with a camera of the type having a camera body, an objective lens, mounting means for said lens movable relative to said body along the axis of said lens for focusing said lens, an erecting system coupling said mounting means with said body including a manually engageable member mounted on the exterior of said camera body for reciprocating motion in a direction transverse the axis of said lens and supporting said mounting means for movement relative to said camera body along the axis of said lens; including:
 a housing mounted on said camera body for holding a photo-flash device, including a source of illumination, in position to direct light toward the subject being photographed;
 an array of apertured plates movably secured within said housing in front of said source of illumination so as to block a variable portion thereof; and
 means for moving at least one of said array of apertured plates a predetermined amount depending on the range of said subject to block a predetermined portion of said illumination as a function of said range.

23. The invention as set out in claim 22, wherein said array of apertured plates are telescopically arranged whereby they may be sequentially advanced as a function of said range.

24. The invention according to claim 23, wherein said means for moving at least one of said array of apertured plates includes:
 a driving link pivotally secured to said housing and biased into engagement with said manually engageable member;
 a link arm pivotally secured to said housing remote from said driving link and slaved to said driving link; and
 cam means connected to said one of said array of apertured plates and in engagement with said link arm whereby movement of said manually engageable member will effect pivotal movement of said driving link and said link arm causing said link arm to drive said cam means and advance said one of said array of apertured plates.

25. The invention as stated in claim 24, further including means for varying said portion of illumination blocked by said array of apertured plates independent of the position of said manually engageable member.

26. The invention of claim 25, wherein said varying means independent of said manually engageable member comprises a trim link pivotally secured to said housing at the pivotal center of said link arm and pivotally secured to said driving link at a predetermined point remote from said pivotal center of said link arm.

* * * * *